United States Patent
Chakravarti et al.

(10) Patent No.: US 7,539,752 B1
(45) Date of Patent: *May 26, 2009

(54) PROACTIVE PREDICTIVE PREVENTATIVE NETWORK MANAGEMENT TECHNIQUE

(75) Inventors: Arvind S Chakravarti, Marlboro, NJ (US); Hossein Eslambolchi, Los Altos Hills, CA (US); Richard Hellstern, Cranbury, NJ (US); John Babu Medamana, Colts Neck, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 100 days.

This patent is subject to a terminal disclaimer.

(21) Appl. No.: 11/703,023

(22) Filed: Feb. 6, 2007

Related U.S. Application Data

(63) Continuation of application No. 11/313,354, filed on Dec. 21, 2005, now Pat. No. 7,191,230, which is a continuation of application No. 10/035,306, filed on Nov. 7, 2001, now Pat. No. 7,007,084.

(51) Int. Cl.
*G06F 15/173* (2006.01)
*G06F 11/00* (2006.01)

(52) U.S. Cl. .................................. 709/224; 714/47
(58) Field of Classification Search ............... 709/223, 709/224; 714/4, 47
See application file for complete search history.

(56) References Cited

U.S. PATENT DOCUMENTS

| | | | | |
|---|---|---|---|---|
| 5,696,701 A | * | 12/1997 | Burgess et al. | 714/25 |
| 5,751,963 A | * | 5/1998 | Umetsu | 709/223 |
| 5,796,633 A | * | 8/1998 | Burgess et al. | 702/187 |
| 5,951,644 A | * | 9/1999 | Creemer | 709/229 |
| 6,002,674 A | * | 12/1999 | Takei et al. | 370/254 |
| 6,167,538 A | * | 12/2000 | Neufeld et al. | 714/47 |
| 6,349,335 B1 | * | 2/2002 | Jenney | 709/224 |
| 6,701,449 B1 | * | 3/2004 | Davis et al. | 714/4 |

* cited by examiner

*Primary Examiner*—William C Vaughn, Jr.
*Assistant Examiner*—Yemane Mesfin
(74) *Attorney, Agent, or Firm*—Michael Haynes PLC; Michael N. Haynes

(57) ABSTRACT

A next generation performance network management system (30') includes a first component (34a) that monitors one or more attributes of network elements ($11_1$-$11_n$, $12_1$-$12_m$, 20 and 26) as well as peripheral devices (16 and 22) and interconnecting links (18, 24) to establish an historic trend for each monitored element. A second performance management system component (34b) monitors, on a near real-time basis, critical attributes of elements identified from historic trends as undergoing performance degradation: If such performance degradation persist, as detected by such near real-time monitoring, then the network operator can repair or replace the element in question to maintain network performance.

20 Claims, 2 Drawing Sheets

PROACTIVE PREDICTIVE PREVENTATIVE NETWORK MANAGEMENT TECHNIQUE

CROSS-REFERENCES TO RELATED APPLICATIONS

This application is a continuation of, claims priority to, and incorporates by reference herein in its entirety, pending U.S. patent application Ser. No. 11/313,354, filed 21 Dec. 2005, now U.S. Pat. No. 7,191,230 which is a continuation of U.S. patent application Ser. No. 10/035,306 filed Nov. 7, 2001 now U.S. Pat. No. 7,007,084, issued 28 Feb. 2006, by the same inventors and similarly titled.

TECHNICAL FIELD

Background Art

In recent years, the needs of large telecommunications subscribers have evolved from a demand for conventional long distance service to a need for high-bandwidth data transmission capability. As the sophistication of large telecommunications subscribers has advanced, so has their capability to monitor the quality of services they receive. Many large subscribers of data communications services now have the ability to detect deviations in the quality of service they receive, often in advance of any detection by the carrier providing the service.

Present-day performance monitoring systems employed by telecommunications carriers typically operate by providing an alarm indication when a particular condition (attribute) exhibited by a network element crosses an alarm threshold. Such systems do not necessarily provide the most practical solution to the problem of monitoring network performance. In practice, setting alarm thresholds to a low setting to track trouble signatures will yield a large number of alarms, often overwhelming network technicians. On the other hand, setting alarm thresholds to a relatively high setting will prevent detection of a network element undergoing a gradual failure.

Thus, there is a need for a network monitoring technique that affords a telecommunications carrier the ability to track the performance of its network by detecting the gradual performance degradation of networks elements over time.

BRIEF SUMMARY OF THE INVENTION

Briefly, in accordance with a preferred embodiment, there is provided a method for maintaining the performance of a network, and more particularly, a data communications network, that includes at least one element, such as a router or switch for example. In accordance with the method, at least one attribute of the element is monitored periodically (e.g., hourly, daily or weekly). The monitored attribute is compared to a corresponding threshold value. Such monitoring and comparison yields an historic performance trend for the element from which a determination can be made whether the there is at least one crucial attribute of the element that warrants closer monitoring. If the closer monitoring is warranted, then the element is monitored in near real time, say every ten minutes, to determine whether a persistent performance degradation exists. If so, then the network element is altered, either by repair or replacement, to ameliorate the performance degradation. The foregoing method enables a network operator to better isolate those network elements that exhibit degraded performance, thus affording the network operator the ability to fix the trouble before the subscriber becomes aware of the problem.

DETAILED DESCRIPTION

Figure 1:
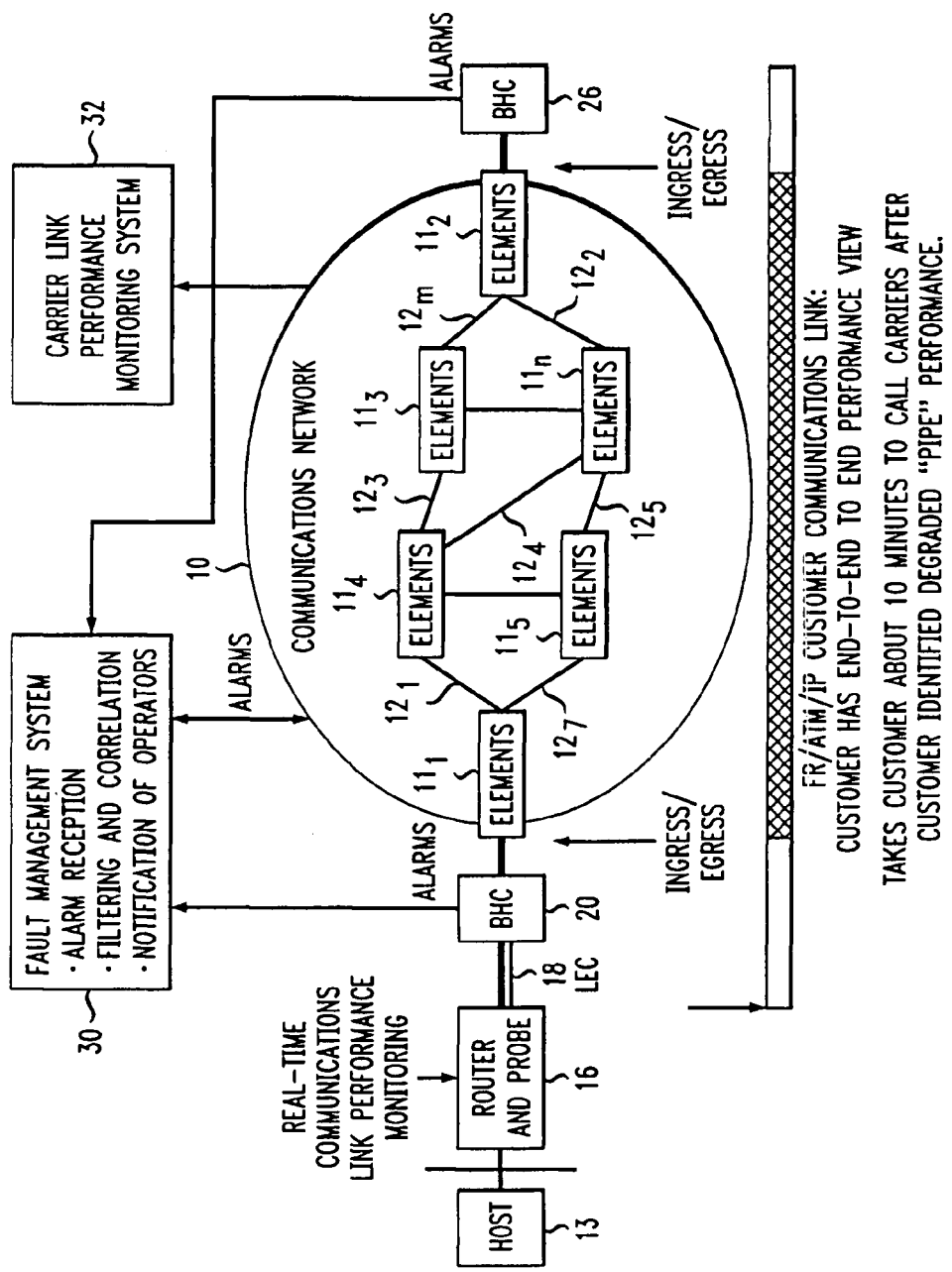
FIG. 1 depicts a block schematic diagram of communications network monitored in accordance with the teachings of the prior art.

FIG. 1 depicts a communications network 10 comprised of a plurality of network elements (e.g., routers) $11_1$-$11_m$ (where m is an integer) interconnected by links $12_1$-$12_n$ (where n is an integer). The network 10 communicates traffic (i.e., data packets) between two or more hosts, exemplified by hosts 13 and 14. A first router 16 links the host 13 to a first Local Exchange Carrier (LEC) 18. A first Backbone-to-Horizontal Cross-connect (BHC) 22 connects the LEC 18 to router $11_1$ within the network 10. The router $11_1$ is "homed" to the host 13 and serves as the ingress/egress router for that host. A second router 22 links the host 14 to a second Local Exchange Carrier (LEC) 24. A second Backbone-to-Horizontal Cross-connect (BHC) 26 connects the LEC 24 to router $11_2$. The router $11_2$ is "homed" to the host 14 and serves as the ingress/egress router for that host.

In practice, the routers 16 and 22 that ultimately link the hosts 13 and 14 to the routers $11_1$ and $11_2$, respectively, each have real-time communications and link performance monitoring ability. Using this capability, each of the hosts 12 and 14 can detect whether the Quality-of Service (QoS) provided by the network 10 meets an agreed quality level, usually governed by a Service Level Agreement (SLA) between the host and the operator of the network 10. In an effort to provide the agreed-to QoS, the operator of the network 10 typically employs a fault management system 30 that monitors alarms generated by each of the elements $11_1$-$11_m$ as well as the BHCs 20 and 26 on a periodic basis. Such received alarm signals are filtered and correlated. Any alarm condition that deviates from a threshold value will cause the fault management system 30 to generate a notification to one or more network technicians. A separate monitoring system 32 monitors the performance of the links $12_1$-$12_n$ by periodically receiving alarm signals associated with one or more link attributes and filtering and correlating such signals to determine if any attribute associated with a particular link, deviates from an associated threshold value.

Typical present-day fault management systems, such as the systems 30 and 32, often suffer from an inability to proactively predict gradually degraded performance on a monitored element to allow the network operator to take timely action to prevent diminution in the QoS afforded each of the hosts 13 and 14. Setting each alarm limit relatively low to track the 'signature" of a monitored generates a large number of notifications that often overwhelm the network technicians. Conversely, setting each alarm relatively high to avoid the problem of overwhelming network technicians incurs the difficulty of detecting gradual performance degradation of one or more network elements.

Figure 2:
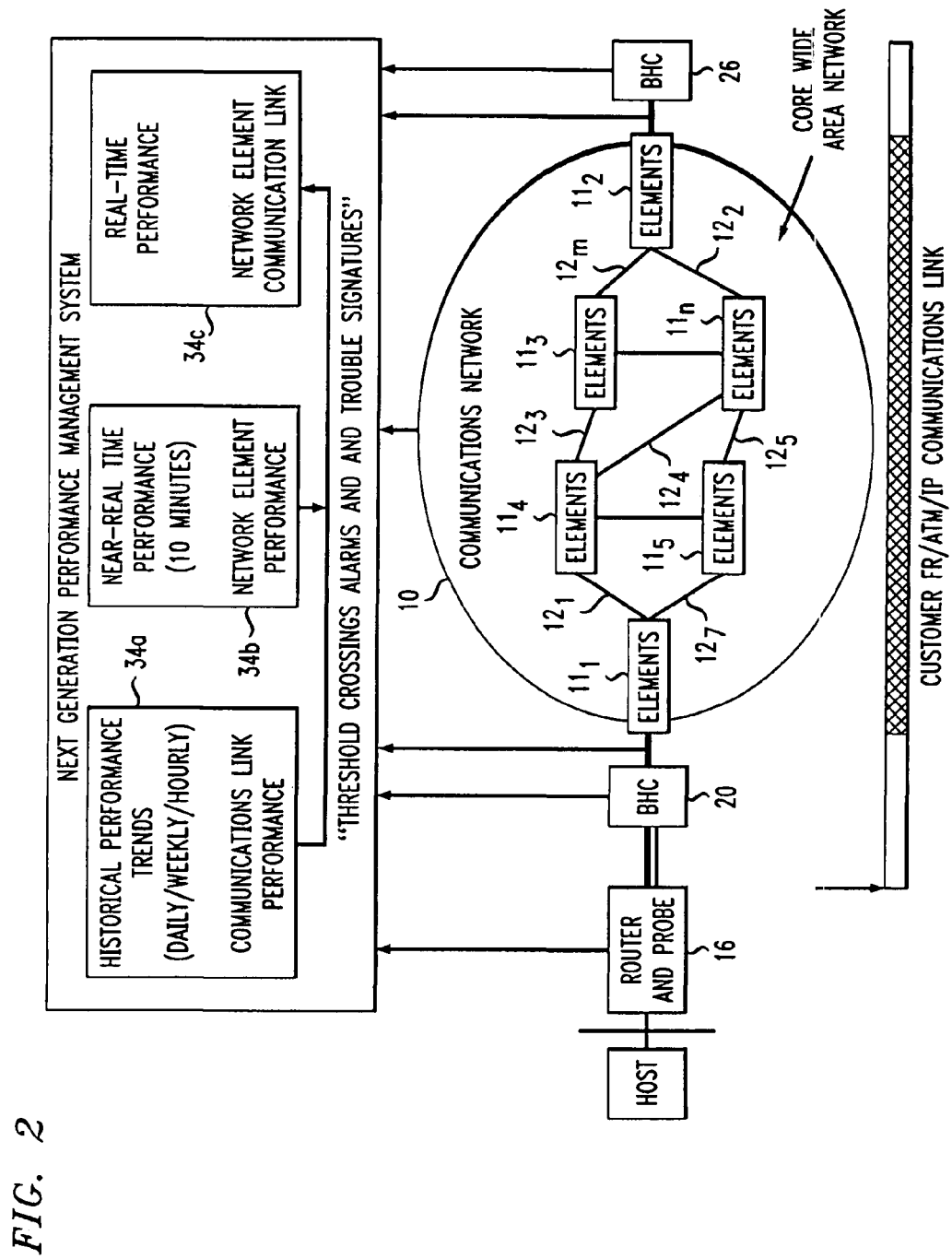
FIG. 2 depicts the communications network of FIG. 1 as monitored in accordance with the teachings of the invention.

FIG. 2 shows a network 10, like the network 10 of FIG. 1, for communicating traffic (i.e., data packets) between two or more hosts, exemplified by hosts 13 and 14. Like reference numerals have been used in FIG. 2 as in FIG. 1 to designate like elements. In accordance with present principles, the network 10 incorporates a next generation performance management system 30' for providing proactive predictive preventative network management. The management system 30' of FIG. 2 has three functional components represented by elements 34a, 34b, and 34c although, as may become better understood hereinafter, a single module could perform the functions individually performed by each of the components. Component 34a monitors various network elements (e.g., routers $11_1$-$11_n$, links $12_1$-$12_m$ and the BHCs 20 and 26) as well as the host routers 16 and 22 and the links connecting the BHCs to the ingress routers of the network 10, to establish an historical trend for each such monitored element.

To establish an historic trend for each monitored element, the component 34a within the performance management system 30' periodically acquires the value of one or more attributes of each monitored element, on a weekly, daily or even hourly basis. The component 34a then filters and correlates the attribute values to determine which attribute exceeds an associated prescribed threshold. For example, the component 34a of the performance management system 30' may establish an historical trend by creating a histogram of the attribute values for each monitored element that exceed the associated threshold.

The information indicative of the historical performance trends of network elements monitored by the component 34a passes to a component 34b that serves to monitor, in near real time, critical performance attribute of elements exhibiting performance degradations, as identified by historical performance monitoring. For example, if component 34a determines that a monitored element, say router $11_1$ persists in its performance degradation, the second component 34b within the performance management system 30' begins near real-time monitoring of that element. In particular, the component 34b commences near real time monitoring of critical performance attributes by detecting their value during much shorter intervals, say every ten minutes, as compared to the performance monitoring interval of the component 34a. By monitoring at least the critical performance attributes of those network elements experiencing persistent performance degradation, the component 34b assures that such network elements receive greater scrutiny than would normally occur with conventional performance monitoring systems. Thus, the monitoring undertaken provided by the performance monitoring system 30' of the invention eliminates the problem of having an overwhelming number of alarm conditions, but still affords the opportunity to detect gradual performance degradation. In addition to performing near real-time monitoring of crucial attributes, the component 34b may also perform near real-time monitoring of other attributes as well.

If performance degradations persist in one or more monitored elements, thus revealing "hot spots" associated with the network 10, the network operator can make alterations by repairing or replacing elements at the source of the problem. In this way, the network elements exhibiting degraded performance are identified first through tracking historical trends and then through the tracking trouble signatures detected by frequent monitoring. Performance alarms may also provide information in addition to, or in place of such trouble signatures, although such performance alarms aren't always supported by certain network elements because of the load placed on such elements by the overhead imposed by performance alarms.

In addition to the component 34b that performs near-real time monitoring of the network elements, the performance monitoring system 30' may also include component 34c that performs real-time monitoring of those particular elements that exhibit degraded performance (i.e., the hot spots discussed previously). To that end, the component 34c monitors such elements exhibiting degraded performance virtually instantaneously (during very short intervals, much shorter than the monitoring interval of component 34b), thus permitting the network operator to alter a network element by repair or replacement to ameliorate a diminution of the quality of service. In this way, the network operator can fix a trouble before a subscriber becomes aware of the problem.

The process by which the performance management system 30' determines which if any network element exhibits persistent performance degradation not only depends on collecting meaningful information, but also depends on a knowledge of the failure mode of each monitored element. Thus the performance management process performed by the system 30' depends on knowing the various ways a monitored element may fail, and the particular attributes necessary for monitoring to detect such a potential failure. Accordingly, the system 30' typically includes a fault model for each monitored element. Such a fault model not only provides an indication of how various monitored attributes change as performance degradation progresses, but may also provide an indication of additional attributes that may require monitoring upon detecting a performance degradation.

The foregoing describes a technique for accomplishing proactive predictive preventative network management.

The above-described embodiments merely illustrate the principles of the invention. Those skilled in the art may make various modifications and changes that will embody the principles of the invention and fall within the spirit and scope thereof.

What is claimed is:

1. A method comprising:
reporting that a network element has persistent performance degradation, said persistent performance degradation automatically determined based upon an attribute of said network element monitored at successive first intervals, a determination that said network element exhibits persistent performance degradation based upon periodic monitoring of said attribute of said network element during successive second intervals that are longer than said successive first intervals, said periodic monitoring of said attribute of said network element during successive second intervals performed responsive to a determination that said attribute warrants closer scrutiny, said determination that said attribute warrants closer scrutiny based upon periodically monitoring said attribute of said network element at successive third intervals that are longer than said successive second intervals.

2. The method according to claim 1, further comprising:
comparing each value of said attribute obtained during each successive third interval to a corresponding threshold associated with said attribute.

3. The method according to claim 1, further comprising:
establishing a historical trend for said network element based upon values of said attribute obtained during said successive third intervals.

4. The method according to claim 1, further comprising:
establishing a histogram for said network element based upon values of said attribute obtained during said successive third intervals.

5. The method according to claim 1, further comprising:
filtering values of said attribute obtained during said successive third intervals to determine that said attribute exceeds an associated prescribed threshold.

6. The method according to claim 1, further comprising:
correlating values of said attribute obtained during said successive third intervals to determine which attribute exceeds an associated prescribed threshold.

7. The method according to claim 1, further comprising:
determining that said attribute warrants closer scrutiny.

8. The method according to claim 1, further comprising:
determining that said attribute warrants closer scrutiny based upon a historical trend associated with said attribute of said network element.

9. The method according to claim 1, further comprising:
tracking trouble signatures based upon values of said attribute obtained during said successive second intervals.

10. The method according to claim 1, further comprising:
determining a performance alarm based upon values of said attribute obtained during said successive second intervals.

11. The method according to claim 1, wherein said attribute of said network element is determined based upon a failure model for said network element.

12. The method according to claim 1, wherein said attribute of said network element at said successive first intervals exhibits persistent performance degradation in real time.

13. A method comprising:
responsive to a determination that a network element exhibits persistent performance degradation, reporting that a network element has persistent performance degradation, said persistent performance degradation automatically determined based upon an attribute of said network element monitored at successive first intervals, a determination that said network element exhibits persistent performance degradation based upon periodic monitoring of said attribute of said network element during successive second intervals that are longer than said successive first intervals, said determination that said attribute warrants closer scrutiny determined from a failure model for said network element based upon periodically monitoring said attribute of said network element at successive third intervals that are longer than said successive second intervals.

14. The method according to claim 13, wherein values for said attribute obtained during said successive first intervals exhibits persistent performance degradation in real time.

15. The method according to claim 13, further comprising:
determining from a failure model of said network element which if any additional attributes require monitoring upon detecting said performance degradation.

16. A method comprising:
responsive to a detection that a Quality-of Service provided by a network does not meet an agreed quality level, reporting that a network element has persistent performance degradation, said persistent performance degradation automatically determined based upon an attribute of said network element monitored at successive first intervals, a determination that said network element exhibits persistent performance degradation based upon periodic monitoring of said attribute of said network element at successive first intervals, said detection that said Quality-of Service provided by said network does not meet said agreed quality level based upon periodic monitoring of said attribute of said network element during successive second intervals that are longer than said successive first intervals, said periodic monitoring of said attribute of said network element during successive second intervals performed responsive to a determination that said attribute warrants closer scrutiny.

17. The method according to claim 16, further comprising:
determining that said attribute warrants closer scrutiny by comparing each value of a plurality of obtained values of said attribute to a corresponding threshold associated with said attribute.

18. The method according to claim 16, further comprising:
establishing a historical trend for said network element based upon obtained values of said attribute.

19. The method according to claim 16, further comprising:
establishing a histogram for said network element based upon values of said attribute obtained during successive third intervals, said third intervals longer than said second intervals.

20. A method comprising:
reporting that a network element has persistent performance degradation, said persistent performance degradation automatically determined based upon an attribute of said network element monitored at successive first intervals, a determination that said network element exhibits persistent performance degradation based upon periodic monitoring of said attribute of said network element during successive second intervals that are longer than said successive first intervals, said periodic monitoring of said attribute of said network element during successive second intervals performed responsive to a determination that said attribute warrants closer scrutiny, said determination that said attribute warrants closer scrutiny based upon an established histogram for said network element based upon obtained values of said attribute.

* * * * *